(12) United States Patent
Sekine et al.

(10) Patent No.: US 11,981,342 B2
(45) Date of Patent: May 14, 2024

(54) DISPLAY AND VOICE OUTPUT CONTROL SYSTEM OF VEHICLE

(71) Applicant: TOYOTA JIDOSHA KABUSHIKI KAISHA, Toyota (JP)

(72) Inventors: Kiyotoshi Sekine, Kakamigahara (JP); Takahiko Kuwabara, Yokohama (JP); Ko Igarashi, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 17/360,453

(22) Filed: Jun. 28, 2021

(65) Prior Publication Data

US 2022/0001887 A1   Jan. 6, 2022

(30) Foreign Application Priority Data

Jul. 1, 2020   (JP) .................................. 2020-114149

(51) Int. Cl.
*B60W 50/14* (2020.01)
*B60K 35/00* (2006.01)
(Continued)

(52) U.S. Cl.
CPC ............. *B60W 50/14* (2013.01); *B60K 35/00* (2013.01); *B60W 40/09* (2013.01); *G06V 20/597* (2022.01); *B60K 35/10* (2024.01); *B60K 35/28* (2024.01); *B60K 35/29* (2024.01); *B60K 2360/119* (2024.01); *B60K 2360/182* (2024.01);
(Continued)

(58) Field of Classification Search
CPC ........ B60K 2370/119; B60K 2370/152; B60K 2370/1575; B60K 2370/162; B60K 2370/167; B60K 2370/178; B60K 2370/182; B60K 2370/1868;
(Continued)

(56) References Cited

U.S. PATENT DOCUMENTS 10,691,132 B2 *  6/2020  Hwang ............... G01C 21/3484
11,198,439 B2 * 12/2021  Mimura .................. H04W 4/46
(Continued)

FOREIGN PATENT DOCUMENTS

CN       108973989 A    12/2018
CN       110667574 A     1/2020
(Continued)

*Primary Examiner* — Tyler J Lee
(74) *Attorney, Agent, or Firm* — Oliff PLC (57) ABSTRACT

A display and voice output control system of a vehicle on which automated driving is performed includes a display device, a voice output device and a controller. The controller controls a notification of a recommended behavior by the display device and the voice output device. In the notification control, it is judged whether or not a notification condition of the recommended behavior is satisfied. If it is judged that the notification condition is satisfied, it is judged whether a notification relaxation condition of the recommended behavior is satisfied based on a status of a driver and a driving status of the vehicle. If it is judged that the notification relaxation conditions is satisfied, relaxation notification processing is executed. Otherwise, normal notification processing is executed. In the relaxation notification processing, an output status of the recommended behavior in the voice output device is controlled to an inactive state.

3 Claims, 8 Drawing Sheets

(51) Int. Cl.
  *B60K 35/10* (2024.01)
  *B60W 40/09* (2012.01)
  *G06V 20/59* (2022.01)
  *B60K 35/28* (2024.01)
  *B60K 35/29* (2024.01)

(52) U.S. Cl.
  CPC . *B60W 2050/143* (2013.01); *B60W 2050/146* (2013.01)

(58) Field of Classification Search
  CPC ..... B60W 2050/143; B60W 2050/146; B60W 40/09; B60W 50/14; G06V 20/597
  See application file for complete search history.

(56) References Cited

U.S. PATENT DOCUMENTS

| | | |
|---|---|---|
| 2016/0262682 A1 | 9/2016 | Omi |
| 2018/0348756 A1 | 12/2018 | Mimura et al. |
| 2019/0232976 A1 | 8/2019 | Uetani et al. |
| 2019/0241189 A1 | 8/2019 | Odate |

FOREIGN PATENT DOCUMENTS

| | | |
|---|---|---|
| JP | 2011-145922 A | 7/2011 |
| JP | 2012-068962 A | 4/2012 |
| JP | 2015-095162 A | 5/2015 |
| JP | 2018-092554 A | 6/2018 |
| JP | 2018-133007 A | 8/2018 |
| JP | 2018-146552 A | 9/2018 |
| JP | 2018-195894 A | 12/2018 |
| JP | 2018-203010 A | 12/2018 |
| WO | 2018/011871 A1 | 1/2018 |

\* cited by examiner

DISPLAY AND VOICE OUTPUT CONTROL SYSTEM OF VEHICLE

CROSS-REFERENCE TO RELATED APPLICATION

The present application claims priority under 35 U.S.C. § 119 to Japanese Patent Application No. 2020-114149, filed Jul. 1, 2020, the contents of which application are incorporated herein by reference in their entirety.

TECHNICAL FIELD

Present disclosure relates to a display and voice output control system of a vehicle in which an automated driving is performed.

BACKGROUND

WO2018/011871A discloses a controller having a function to support an operation of a vehicle by a driver. In this conventional controller, it is judged whether or not a precondition (specifically, whether or not the driver is in a state of monitoring surroundings of the vehicle) is satisfied to execute travel assist control for supporting acceleration, braking and steering of the vehicle. The travel assist control is executed when it is judged that this precondition is satisfied. The judgement of the precondition is also repeatedly executed during the execution of the travel assist control.

SUMMARY

Assume that the judgement of the precondition is applied to automated driving control. The "automated driving control" is vehicle control in which a part or all of driving operations performed by the driver of the vehicle (i.e., acceleration, braking and steering of the vehicle) is automatically executed. For the automated driving control, it is required to set preconditions differing from the preconditions mentioned above. By setting the preconditions appropriately, it is possible to judge whether or not to start and end the automated driving control.

Consider a case where the judgement result of the preconditions during automated driving control is negative. In this case, the system executing the automated driving control is anticipated to perform some attention-seeking on the driver in preparation for a case where it becomes difficult to continue the automated driving control. As attention-seeking measure in this case, a display device and a voice output device are assumed. JP2018-146552A discloses an example of the attention-seeking measure.

According to the display device, it is possible to notify a recommended behavior visually to the driver. According to the voice output device, it is possible to notify the recommended behavior audibly to the driver. However, if the recommended behavior is notified more than needed, the driver may feel that it is troublesome. Therefore, it is desirable to develop a technology to perform attention-seeking in case it becomes difficult to continue automated driving control and to suppress the driver from feeling annoyed with this attention-seeking.

It is an object of present disclosure to provide a technology that can prevent the driver from feeling annoyed with the attention-seeking while performing as needed the attention-seeking to the driver during the execution of the automated driving control.

A first aspect of the present disclosure is a display and voice output control system of a vehicle in which an automated driving is performed.

The control system includes a display device, a voice output device, and a controller.

The display device is configured to visually notify a recommended behavior of a driver during the automated driving.

The voice output device is configured to audibly notify the recommended behavior.

The controller is configured to execute notification control of the recommended behavior by the display device and the voice output device.

In the notification control, the controller is configured to:
 judge whether or not a notification condition of the recommended behavior is satisfied;
 if it is judged that the notification condition is satisfied, judge, based on a status of the driver and a driving status of the vehicle, whether or not a notification relaxation condition of the recommended behavior is satisfied;
 if it is judged that the notification relaxation condition is not satisfied, execute normal notification processing in which an output status of the recommended behavior in both the display device and the voice output device is controlled to an active state; and
 if it is judged that the notification relaxation conditions is satisfied, execute relaxation notification processing in which the output status in the voice output device is controlled to an inactive state.

A second aspect of the present disclosure further has the following features in the first aspect.

The display device includes a plurality of display devices.

In the relaxation notification processing, the controller is configured to control the output status in a part of the plurality of display devices and the voice output device to the inactive state.

A third aspect of the present disclosure further has the following features in the first aspect.

A notification of the recommended behavior by the display device is performed by individually displaying an icon indicating the recommended behavior on a plurality of display areas of the display device.

In the relaxation notification processing, the controller is configured to control both a display state of the icon in a part of the plurality of display area and the output state in the voice output device to the inactive state.

According to the present disclosure, a two-step judgment including the notification condition and the notification relaxation conditions is performed. When this two-step judgment is performed, it is possible to minimize the notification of the recommended behavior during the automated driving control. Therefore, it is possible to suppress the driver from feeling annoyed with the attention-seeking while performing the attention-seeking in case it becomes difficult to continue automated driving control.

DESCRIPTION OF EMBODIMENTS

Hereinafter, an embodiment of the present disclosure will be described referring to drawings. Note that the present disclosure is not limited to the embodiment described below, and can be implemented in various embodiments.

Figure 1:
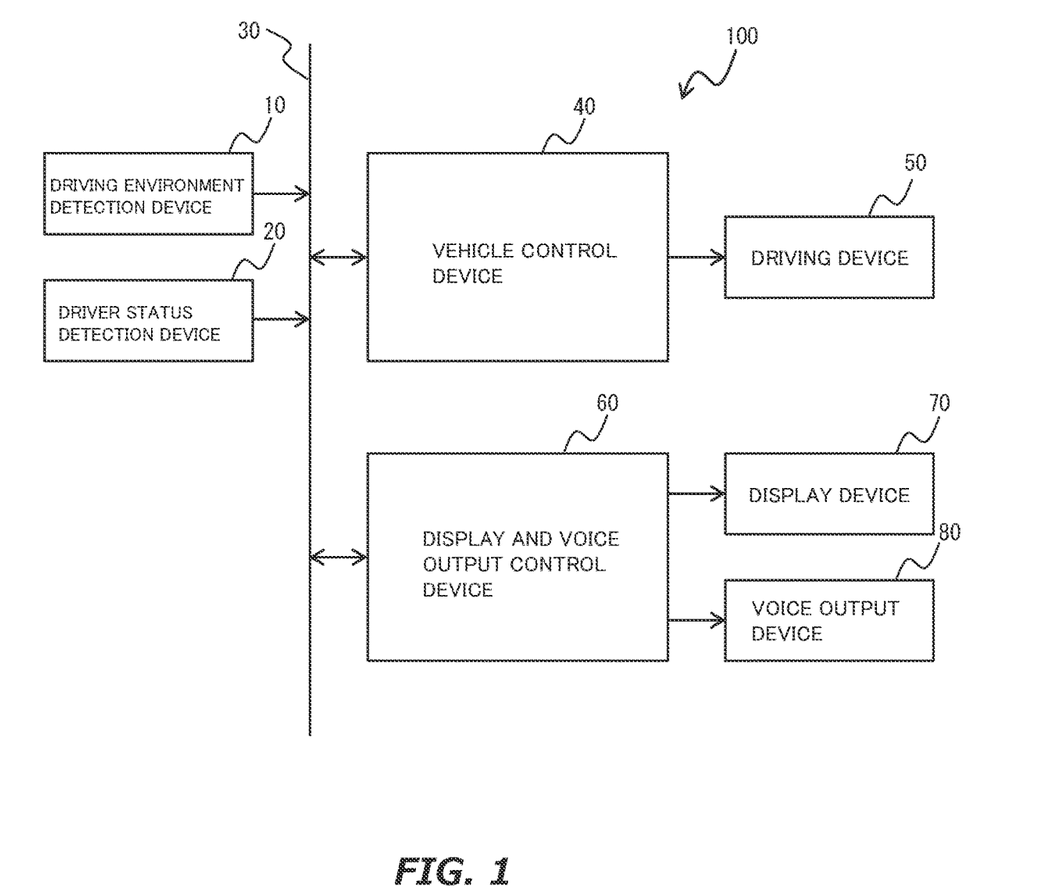
FIG. 1 is a diagram showing a configuration example in which a display and voice output control system according to an embodiment is applied to a vehicle.

1. Configuration Example 1-1. Configuration Example of a Vehicle for an Automated Driving FIG. 1 is a diagram showing a configuration example in which a display and voice output control system according to an embodiment is applied to a vehicle. It should be noted that only a configuration related to the present disclosure is depicted in FIG. 1. Examples of a vehicle 100 shown in FIG. 1 include a vehicle using an engine as a power source, an electronic vehicle using a motor as a power source, and a hybrid vehicle including the engine and the motor. The motor is driven by a battery such as a secondary cell, a hydrogen cell, a metallic fuel cell, and an alcohol fuel cell.

The vehicle 100 has a configuration to execute automated driving control. The "automated driving control" is vehicle control in which part or all of driving operations performed by a driver of the vehicle 100 is automatically performed. As the driver of the vehicle 100, not only a driver actually sitting in a driver's seat of the vehicle 100, but also a remote driver (an operator) residing in a remote place is assumed.

The automated driving control includes drive control, braking control and steering control. In the example shown in FIG. 1, a driving environment detection device 10, a driver status detection device 20, an in-vehicle network 30 (e.g., a CAN (Controller Area Network)), a vehicle control device 40 and a driving device 50 correspond to configurations to execute the automated driving control.

The driving environment detection device 10 detects or acquires information indicating driving environment of the vehicle 100 (hereinafter, also referred to as "driving environment information"). Examples of the driving environment information include information on actual location, vehicle status information, surrounding situation information, map information, and communication information.

The information on actual location is information that indicates a current position of the vehicle 100. The information on actual location is obtained, for example, by an in-vehicle GPS (Global Positioning System) receiver.

The vehicle status information is information that indicates the status of the vehicle 100. Examples of the information indicating the status of the vehicle 100 include vehicle speed, yaw rate, lateral acceleration, and steering angle. The vehicle status information is detected, for example, by various sensors (e.g., a wheel speed sensor, a yaw rate sensor, an acceleration sensor and a steering torque sensor) mounted on the vehicle. These state sensing sensors are also referred to as internal sensors.

The surrounding situation information indicates a state of a periphery of the vehicle 100. The surrounding situation information includes image data captured by a camera of the vehicle. The surrounding situation information includes measurement data measured by a radar of the vehicle. The recognition-related equipment such as the camera and the radar is also called an external sensor.

Examples of the map information include types of roads (e.g., public highway and expressway), shapes of the roads (e.g., gradient and curvature), positions of signals installed on the roads, and speed limits. The map information includes common navigational maps. The map information is stored in a map database. The map database may be mounted on the vehicle or may be mounted on a management server outside the vehicle. In the latter case, the map information is included in the communication information.

The communication information is information provided by an information provision system. The communication information is acquired by an in-vehicle communication device. The communication information includes road traffic information such as a traffic jam, a traffic accident, a construction section, lane regulations, etc. The communication information also includes weather data.

The driver status detection device 20 detects or acquires information indicating a status of the driver (hereinafter also referred to as "driver status information"). Examples of the driver status detection device 20 include a driver monitoring camera and a steering touch sensor. The driver monitoring camera images a face of the driver. The driver monitoring camera may be provided at least two in order to image the face of the driver from at least two directions. The steering touch sensor detects a touch of the driver to a steering wheel and pressure at which the driver grips the steering wheel.

The vehicle control device 40 is a microcomputer that includes at least one processor, at least one memory, and an input and output interface. The vehicle control device 40 obtains various information via the input interface and output interface. The vehicle control device 40 executes automated driving control based on this various information.

When executing the automated driving control, the vehicle control device 40 judges whether or not a precondition PC for executing the automated driving control is satisfied. The precondition PC is composed of, for example, the following conditions PC1 to PC6.

PC1: the vehicle locates in an area where the automated driving control can be executed.

PC2: a recognition status of the external sensor is normal.

PC3: vehicle speed is less than a threshold

PC4: steering angle is less than a threshold

PC5: a variation of a vehicle motion (e.g., acceleration, deceleration, roll rate, pitch rate, and yaw rate) is less than a threshold.

PC6: doors and windows of the vehicle are closed.

The conditions PC1 to PC6 is judged based on the driving environment information. If all conditions PC1 to PC6 are satisfied, it is judged that the precondition PC is satisfied. If the judgement result of the precondition PC is positive, the vehicle control device 40 sets a target route and generates a driving plan. The target route is represented by a set of target positions to which the vehicle 100 should reach during the execution of the automated driving control. The target positions are set at predetermined intervals (e.g., 1 meter) in an extending direction of the target route. The driving plan is generated based on the target route and the driving environment information. The driving plan includes a control target value of a driving device 50 set for each of the target positions. The control target value includes a target lateral location and target vehicle speed. The vehicle control device 40 transmits control signals indicating the control target value to the driving device 50.

The driving device 50 includes a steering device, a driving device and a braking device. The steering device steers wheels of the vehicle 100. For example, the steering device includes an electric power steering (EPS: Electric Power Steering) device. The driving device is a power source for generating a driving force. Examples of the driving device include the engine and the motor. The braking device generates a braking force.

1-2. Configuration Example of the Display and Voice Output Control System

In the example shown in FIG. 1, the display and voice output control device 60, the display device 70 and the voice output device 80 correspond to the display and voice output control system according to the present embodiment.

The display and voice output control device 60 is a microcomputer that includes at least one processor, at least one memory, and an input and output interface. The display and voice output control device 60 is connected to the driving environment detection device 10, the driver status detection device 20, and the vehicle control device 40 via the network 30.

The display and voice output control device 60 obtains display information and voice information via the network 30 when an event occurs to output the display information and voice information by these in-vehicle equipment (hereinafter, also referred to as "output event"). The display and voice output control device 60 then outputs the display information and the voice information. A configuration example of the display and voice output control device 60 will be described later.

The display device 70 is connected to the display and voice output control device 60. Examples of the display device 70 include a meter panel installed in front of a driver's seat. Another example of the display device 70 is a head-up display that displays the display information on a front window. Yet another example of the display device 70 is a liquid crystal display that displays navigational maps and the like. The display device 70 includes at least one of these display devices. The display device 70 displays the display information based on the output signals from the display and voice output control device 60.

The voice output device 80 is connected to the display and voice output control device 60. Examples of the voice output device 80 include a speaker and a buzzer. The voice output device 80 outputs the voice information based on the output signals from the display and voice output control device 60.

2. Configuration Example of the Display and Voice Output Control Device

Figure 2:
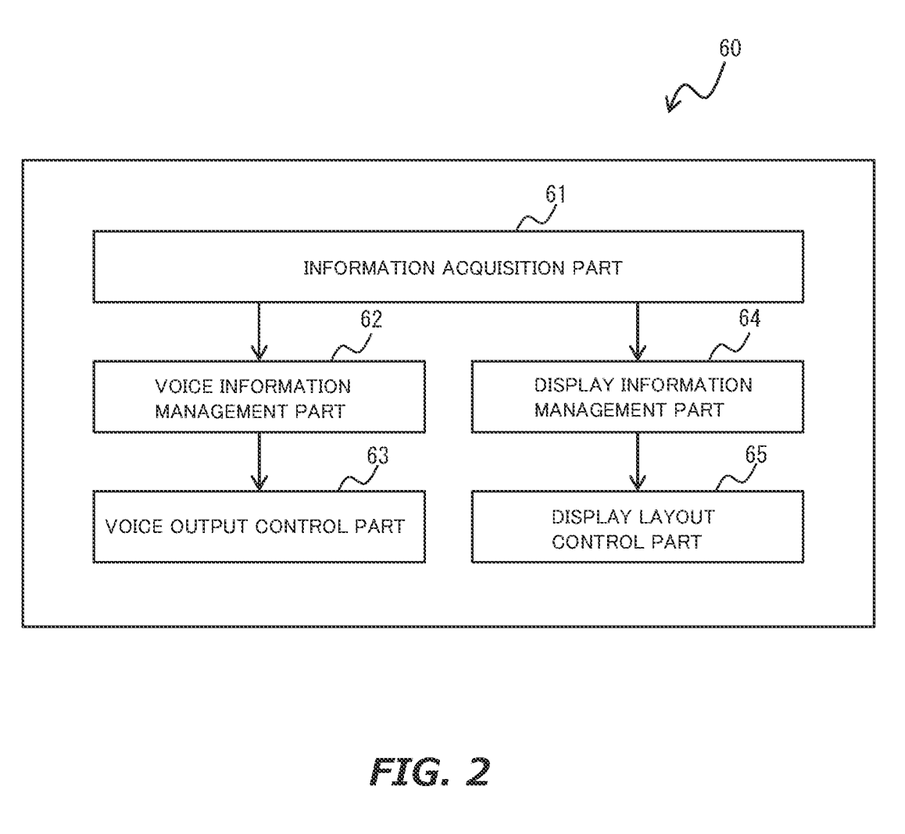
FIG. 2 is a diagram showing a configuration example of a function of the display and voice output control device shown in FIG. 1.

FIG. 2 is a diagram showing a configuration example of a function of the display and voice output control device 60 shown in FIG. 1. In the example shown in FIG. 2, the display and voice output control device 60 includes an information acquisition part 61, a voice information management part 62, a voice output control part 63, a display information management part 64, and a display layout control part 65. These functions are realized when the processor of the display and voice output control device 60 executes various control programs stored in the memory.

When the output event of the display information and voice information occurs in the driving environment detection device 10 or the vehicle control device 40, the information acquisition part 61 acquires these information via the network 30. Examples of the information include "vehicle speed" detected by the driving environment detection device 10 and "autonomous driving control information" of the autonomous driving control executed by the vehicle control device 40. The autonomous driving control information includes upper limit speed information, inter-vehicle distance information and surrounding vehicle information. The upper limit speed information indicates an upper limit of the vehicle speed in the automated driving control. The inter-vehicle distance information indicates information on a distance from the vehicle 100 to a preceding vehicle when the preceding vehicle is present. The surrounding vehicle information indicates information on other vehicles around vehicle 100 that run in the same direction as the vehicle 100.

The information acquisition part 61 further acquires information related to the output event via the network 30 when the output event occurs in a navigation system or an audio system (not shown). Examples of the information include "route guidance information" by navigation system, and "audio information" by the audio system.

Figure 3:
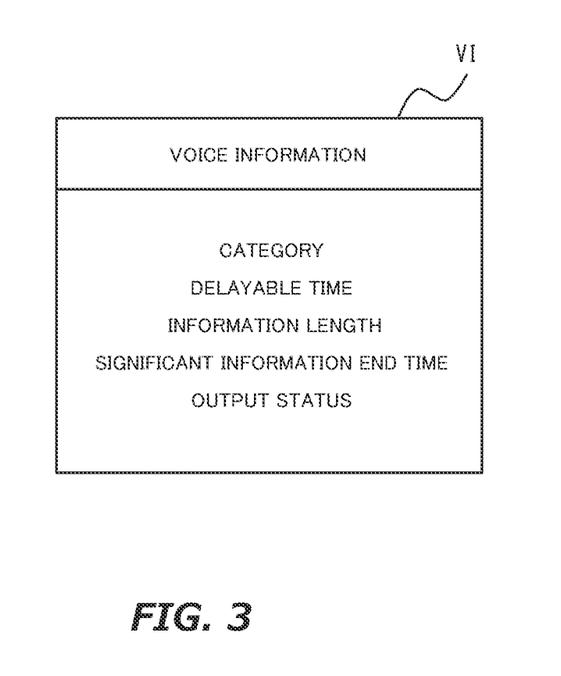
FIG. 3 is a diagram showing an example of voice information and its attribution.

The voice information management part 62 manages the voice information. The voice information management part 62 stores various attributions corresponding to the voice information acquired by the information acquisition part 61 for each voice information. FIG. 3 is a diagram showing an example of the voice information and its attribution. In the illustration shown in FIG. 3, attributions of the voice information VI are defined as a "category", a "delayable time", an "information length", a "significant information end time" and an "output status".

The category is information that defines type of the voice information VI according to purposes and contents of the notification. Examples of the category include an "attention-seeking", a "failure notification", a "route guidance" and "entertainment information". Here, the attention-seeking and the failure notification are categories set from a viewpoint of securing a driving safety. The attention-seeking includes "recommended behavior notification" during the execution of the automated driving control. Examples of the recommended behavior include, an action to grip the steering wheel and an action to monitor the periphery of the vehicle. The recommended behavior notification is defined as a category independent of the attention-seeking.

Here, "Hands-on" and "Hands-off" are defined as expressions that simply represent a gripping status of the steering wheel. The "Hands-on" is defined as a condition in which driver's hand is at least touching the steering wheel. The "Hands-off" is defined as a condition in which the driver's hand is away from the steering wheel. In addition, "Eyes-on" and "Eyes-off" are defined as expressions that simply represent the line of sight status of the driver. The "Eyes-on" is defined as a condition in which the driver is monitoring the periphery of the vehicle. The "Eyes-off" is defined as a condition in which the driver is not monitoring the periphery of the vehicle. In the present disclosure, the recommended behavior notification is defined as a notification requesting at least one of the "Hands-on" and the "Eyes-on".

The delayable time is information that defines an allowable delay time from time at which a voice output event occurs to time at which an output of the voice information VI is executed. A short delayable time is set for critical voice information VI that require quick notification to the driver. For less urgent voice information VI, a longer delayable time is set.

The information length indicates information indicating how long it takes to output the voice information VI to its end. The significant information end time is information that indicates an estimated time at which the voice information VI being output ends a transmitting significant content therein. The significant information end time is calculated, for example, the information length plus a start time at which the voice information VI is outputted. If an end-of-sentence wording that does not contain the significant content in the voice information VI can be omitted, the significant information end time is set shorter than the information length.

The output status indicates information on whether or not the voice information VI is a target of an outputting. The output status is defined by an "active state" and an "inactive state". The active state indicates that the voice information is the target of the outputting. The inactive state indicates that the voice information is not the target of the outputting. In another example, the active state indicates that the voice information is outputted in a normal condition. The inactive state indicates that the voice information is outputted in a more relaxed state than the normal state. When an event that needs to output the voice information VI occurs, the output status of the voice information VI corresponding to this event, in principle, indicates the active state.

When the voice output event occurs, the voice information management part 62 provides the voice output control part 63 with the attributions of the voice information VI corresponding to this event.

The voice output control part 63 executes voice output control based on the attributions of the voice information VI provided from the voice information management part 62. The voice output control includes adjusting an output schedule of one or more voice information VI when multiple voice output events occur whose output times are overlapped therebetween. This adjustment is executed based on the attributions of the voice information VI. For example, an output order of the voice information VI is determined based on priority according to the category. In this priority, for example, the attention-seeking is set to be the highest. The priority is set lower in the order of the recommended behavior notification, the failure notification, the route guidance, and the entertainment information. When the significant information end time shorter than the information length is included, the ending time is adopted.

The voice output control further includes the output control of the recommended behavior notification during the execution of the automated driving control. Details of this output control will be described later in "3. Recommended behavior notification control". The voice output control part 63 outputs a signal of the voice information VI to the voice output device 80 that is outputted as a result of the execution of the voice output control.

Figure 4:
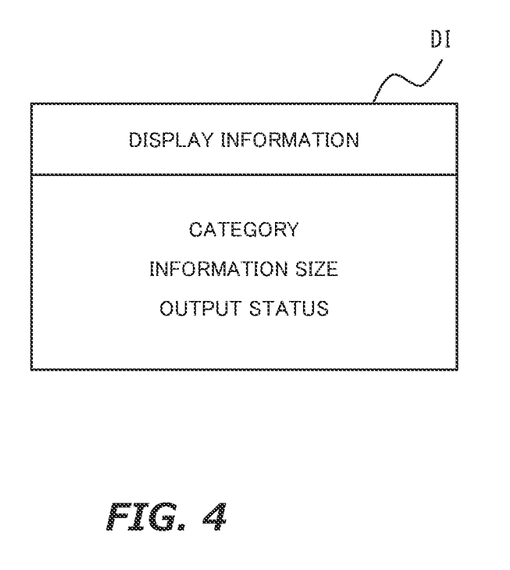
FIG. 4 is a diagram showing an example of display information and its attribution.

The display information management part 64 manages the display information. The display information management part 64 stores various attributions corresponding to the display information acquired by the information acquisition part 61 for each display information. FIG. 4 is a diagram showing an example of display information and its attribution. In the illustration shown in FIG. 4, attributions of the display information DI are defined as a "category", an "information size" and an "output status".

The category is information that defines type of the display information DI according to purposes and contents of the notification. Examples of the category include the "attention-seeking", the "recommended behavior notification", the "failure notification", the "route guidance" and the "entertainment information". That is, the category of the display information DI matches that of the voice information VI.

The information size is information that indicates a size of an area required for displaying the display information DI. The information size is represented by, for example, number of pixels in vertical and horizontal directions.

The output status is information that indicates whether or not the display information DI is the target of the outputting. The output status is defined by the "active state" and the "inactive state". The active state indicates that the display information DI is the target of the outputting. The inactive state indicates that the display information DI is not the target of the outputting. When an event that needs to output the display information DI occurs, the output status of the display information DI corresponding to this event, in principle, indicates the active state.

The display information management part 64 provides the attributions of the display information DI corresponding to the events to the display layout control part 65 when an display event occurs.

The display layout control part 65 executes display layout control in which the display information DI is allocated to a plurality of display areas of the display device 70 based on the attributions of the display information DI supplied from the display information management part 64. The plurality of display areas are set, for example, by dividing one screen of the display device 70 into a plurality of screens. The display area alter the division may be subdivided into a plurality of pieces. In other example, the display device 70 includes two or more devices. In this alternative example, a plurality of display areas are set for each of two or more screens of the display devices.

Figure 5:
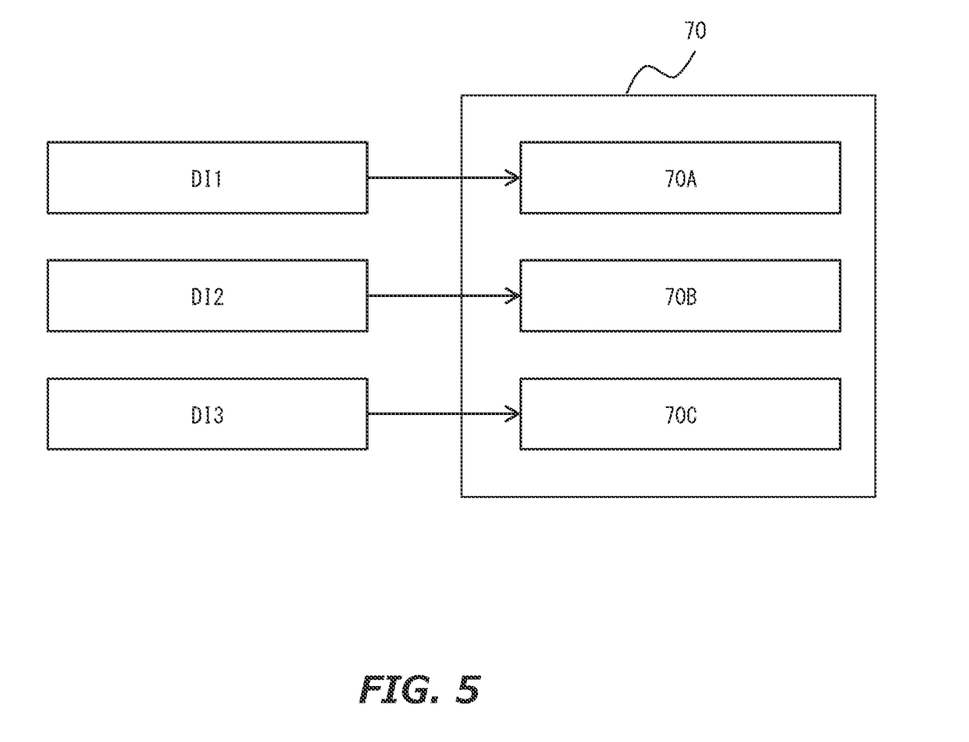
FIG. 5 is a diagram for explaining an example of display layout control.
Figure 6:
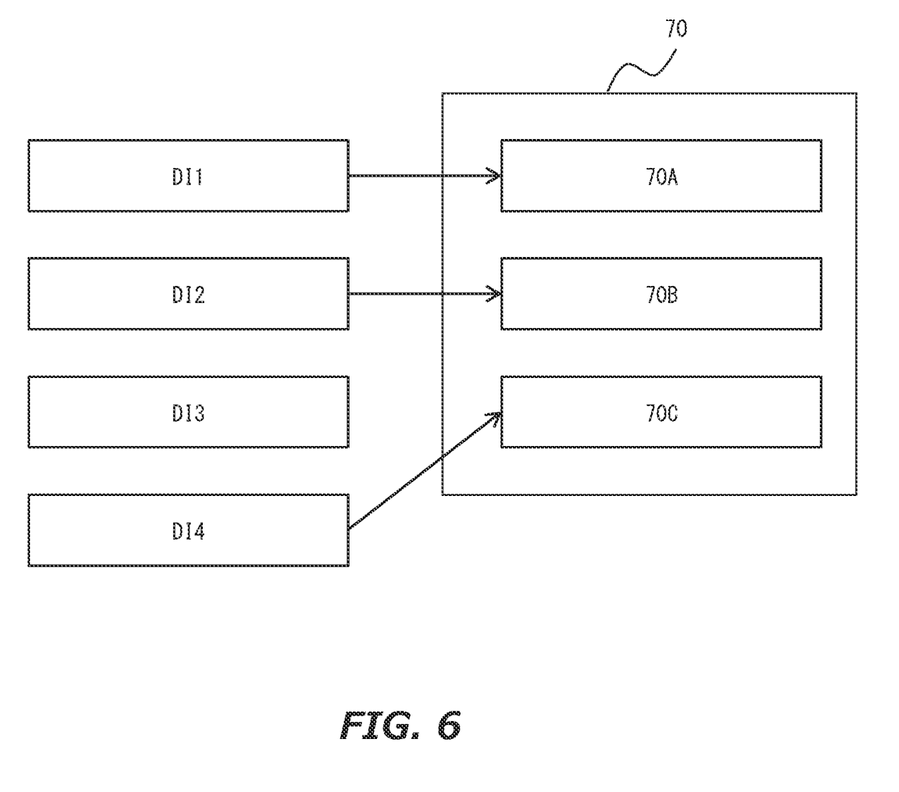
FIG. 6 is a diagram for explaining an example of display layout control.

FIGS. 5 and 6 are diagrams for explaining examples of the display layout control. In the example shown in FIG. 5, three types of display information DI1 to DI3 whose output times are overlapped and three types of display areas 70A to 70C are depicted. The display areas 70A to 70C are set in one screen of the display device 70. In the example shown in FIG. 6, display information DI4 is further depicted.

In the display layout control, these display information are allocated based on the respective attributions of the display information DI. The example shown in FIG. 5 illustrates a case where there is no overlap among the information size. In this case, each of the display information DI1 to DI3 is allocated to respective display area 70A to 70C of which screen size match the information size.

The example shown in FIG. 6 show a case where the information size of the display information DI3 overlaps that of the display information DI4. In this case, the display information DI3 or DI4 is adjusted based on the priority according to the category. In this case, the display information DI4 of which the higher priority is allocated to the display area 70C. Note that as to the display information DI3 of which the lower priority, the output status is switched from the active state to the inactive state.

The display layout control includes output control of the recommended behavior notification during the automated driving control. Details of this output control will be described later in "3. Recommended behavior notification control". The display layout control part 65 outputs a signal of the display information DI to the display device 70 that is outputted as a result of the execution of the display layout control.

3. Recommended Behavior Notification Control

3-1. Outline

During the execution of the automated driving control, the voice output event and the display event of the recommended behavior may occur. In particular, these events occur when a notification condition NC of the recommended behavior (details are described later) which will be described in more detail below, is satisfied. If the voice output event of the recommended behavior occurs, the recommended behavior notification is performed by the voice output device 80 as a result of the execution of the voice output control. If the display event of the recommended behavior occurs, the recommended behavior notification is performed by the display device 70 as a result of the execution of the display layout control.

As described above, the recommended behavior notification is the attention-seeking performed from the viewpoint of securing the driving safety. The recommended behavior notification is categorized in an urgent category. However, if excessive recommended behavior notification is performed, the driver may feel that it is troublesome. Therefore, in the present embodiment, when the voice output event and the display event of the recommended behavior occur, processing is executed to switch the output status of the recommended behavior notification to the inactive state intentionally in the voice output control and display layout control.

If all output status of the recommended behavior notification are switched to the inactive state, it is impossible to secure the driving safety which is an original object of the notification. Therefore, in the present embodiment, only when a notification relaxation condition MC (details are described later) is satisfied, processing is executed to switch the output status of the recommended behavior notification by the voice output device 80 to the inactive state (i.e., relaxation notification processing). In the relaxation notification processing, for example, the output status of the recommended behavior notification by the display device 70 is kept in the active state. The reason for this is based on an ergonomic aspect that auditory notifications are relatively more annoying than visual notifications.

In another example of the relaxation notification processing, in addition to the voice output device 80, the output status of the recommended behavior notification in part of the display area of the display device 70 is switched to inactive state. In yet another example of the relaxation notification processing, in addition to the voice output device 80, the output status of the recommended behavior notification in some of the two or more display devices 70 is switched to the inactive state.

3-2. Control Processing Example

Figure 7:
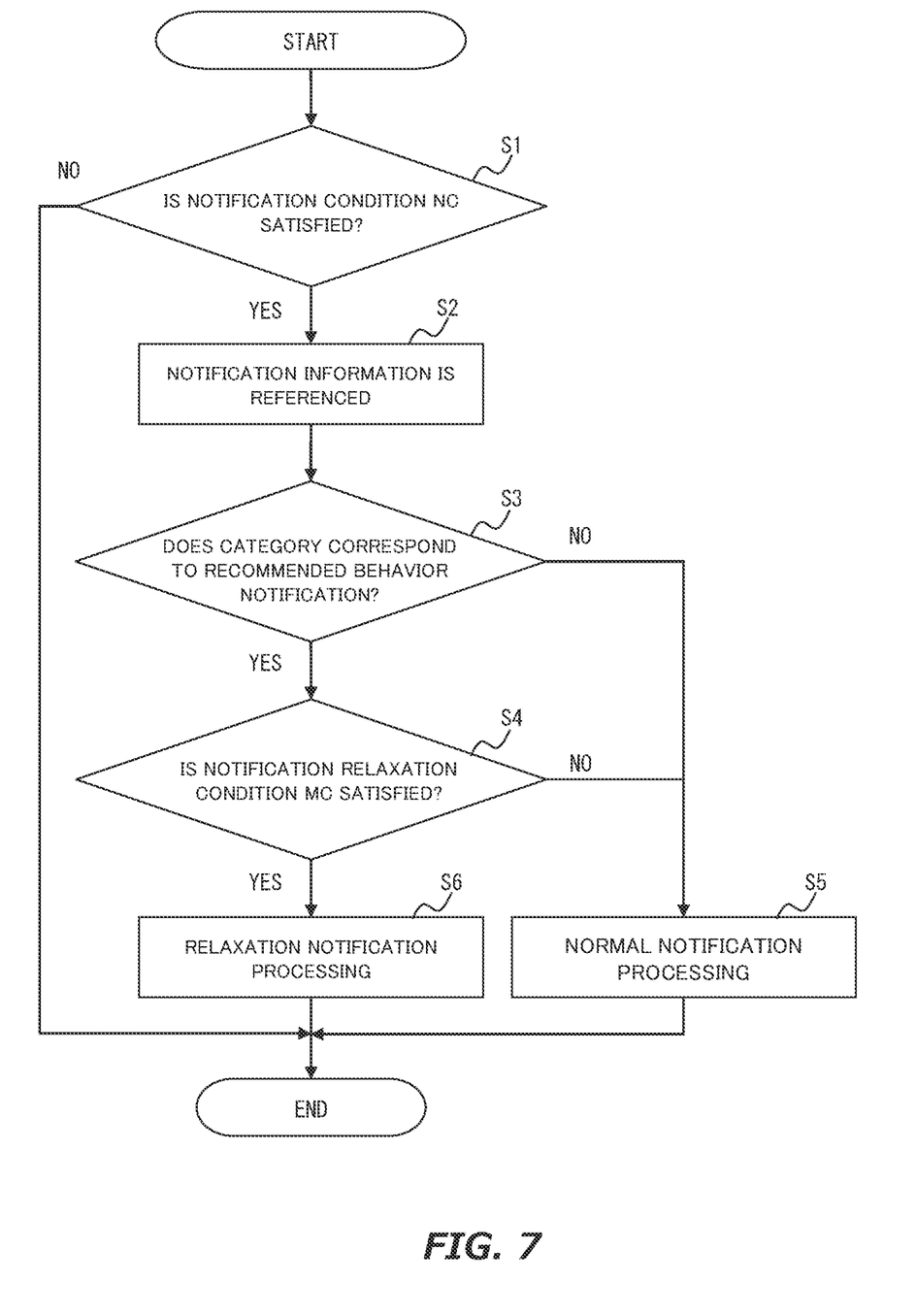
FIG. 7 is a flowchart illustrating process flow related to recommended behavior control executed by a processor of the display and voice output control device.

FIG. 7 is a flowchart illustrating process flow related to recommended behavior control executed by the processor of the display and voice output control device 60. The routine shown in FIG. 7 is repeatedly executed at a predetermined control cycle when the precondition PC is satisfied. Whether the precondition PC is satisfied may be judged independently by the processor of the display and voice output control device 60, or may be judged by acquiring a result of a judgment executed by the vehicle control device 40.

In the routine shown in FIG. 7, first, it is judged whether or not the notification condition NC is satisfied (step S1). The notification condition NC is composed of, for example, the following conditions NC1 to NC5.

NC1: the driving plan containing a lane change in near future including an interflow or branching action was generated.

NC2: specific communication information on a route along which the vehicle travels is received (e.g., lane regulation information, traffic jam tail information, road obstacle information, bad weather information).

NC3: the driver monitoring camera cannot recognize the driver (e.g., backlight, a strain in a lens of the camera, main part of the driver's face is covered or the driver wears infrared-cut sunglasses).

NC4: the vehicle control device 40 is in the execution of the lane change.

NC5: a tire pressure sensor is in a warning status

Each of the conditions NC1 to NC5 corresponds to an aggressive notification condition NC. Although not the aggressive notification condition NC, the following conditions NC6 and NC7 are examples of the notification condition NC for raising the driving awareness of the driver. The conditions NC6 and NC7 are optionally added to the notification condition NC.

NC6: the driver looked aside or closed his or her eyes for a period of time (e.g., 10 seconds)

NC7: the recommended behavior has not been notified for a certain period of time (e.g., 10 minutes)

Each of the conditions NC1 to NC7 is judged based on the driving environment information and the driver status information. If at least one of the conditions NC1 to NC5 (or the condition NC1 to NC7) is satisfied, it is judged that the notification condition NC is satisfied.

If the judgement result of step S1 is negative, the notification processing of this time ends. If the judgement result of the step S1 is positive, notification information is referenced (step S2). The notification information includes the voice information VI and the display information DI.

Subsequent to the step S2, it is judged whether or not the category corresponds to the recommended behavior notification (step S3). The category is defined as the attribution of the notification information that was referenced in the step S2. If the judgement result of the step S3 is positive, processing of the step S4 is executed. If the judgement result of the step S3 is negative, the processing of the step S5 is executed.

In the step S4, it is judged whether or not the notification relaxation condition MC is satisfied. The notification relaxation conditions MC is composed of, for example, the following conditions MC1 to MC4.

MC1: vehicle speed is low (e.g., 10 km/h or less)

MC2: driver is in the "Hands-on" state or the "Eyes-on" state.

MC3: the "Hands-on" state or the "Eyes-on" state by the driver was kept for a certain period during previous notification of the recommended behavior.

MC4: the "Hands-on" state or the "Eyes-on" state by the driver was kept for a certain period until immediately before the notification of this recommended behavior.

As the notification relaxation condition MC, the following conditions MC5 to MC7 corresponding to a particular condition that constitutes the notification condition NC is also assumed.

MC5: lane change in the near future is repeated several times in a short time (i.e., a condition corresponding to the condition NC1).

MC6: recognition failure signal from the driver camera is inputted many times within a certain period (a condition corresponding to the condition NC3).

MC7: an occurrence of lane change performed by the driver's input (a condition corresponding to the condition MC4).

The satisfaction of the conditions MC1 to MC7 is judged based on the driving environment information and the driver status information. If at least one of the conditions MC1 to MC4 is satisfied, it is judged that the notification relaxation condition MC is satisfied. Alternatively, if the condition NC1, NC3 or NC4 is satisfied and the condition MC corresponding to the condition NC is satisfied, it is also judged that the notification relaxation condition MC is satisfied. If the judgement result of the step S4 is positive, the processing of the step S6 is executed. If the judgement result of the step S4 is negative, the processing of the step S5 is executed.

In the step S5, the normal notification processing is executed. When the normal notification processing is executed, the recommended behavior is notified from all of the display device 70 and the voice output device 80 according to the execution of the display layout control and the voice output control.

In the step S6, the relaxation notification processing is executed. In the relaxation notification processing, the output status of the recommended behavior notification supplied to the voice output control part 63 is switched from the active state to the inactive state. In another example, in addition to this output status, the output status of the recommended behavior notification displayed in some display areas of the display device 70 is switched from the active state to the inactive state. In yet another example, the output status of the recommended behavior notification in some of the two or more display devices 70 is switched from the active state to the inactive state.

3-3. Example of Specific Notification

Figure 8:
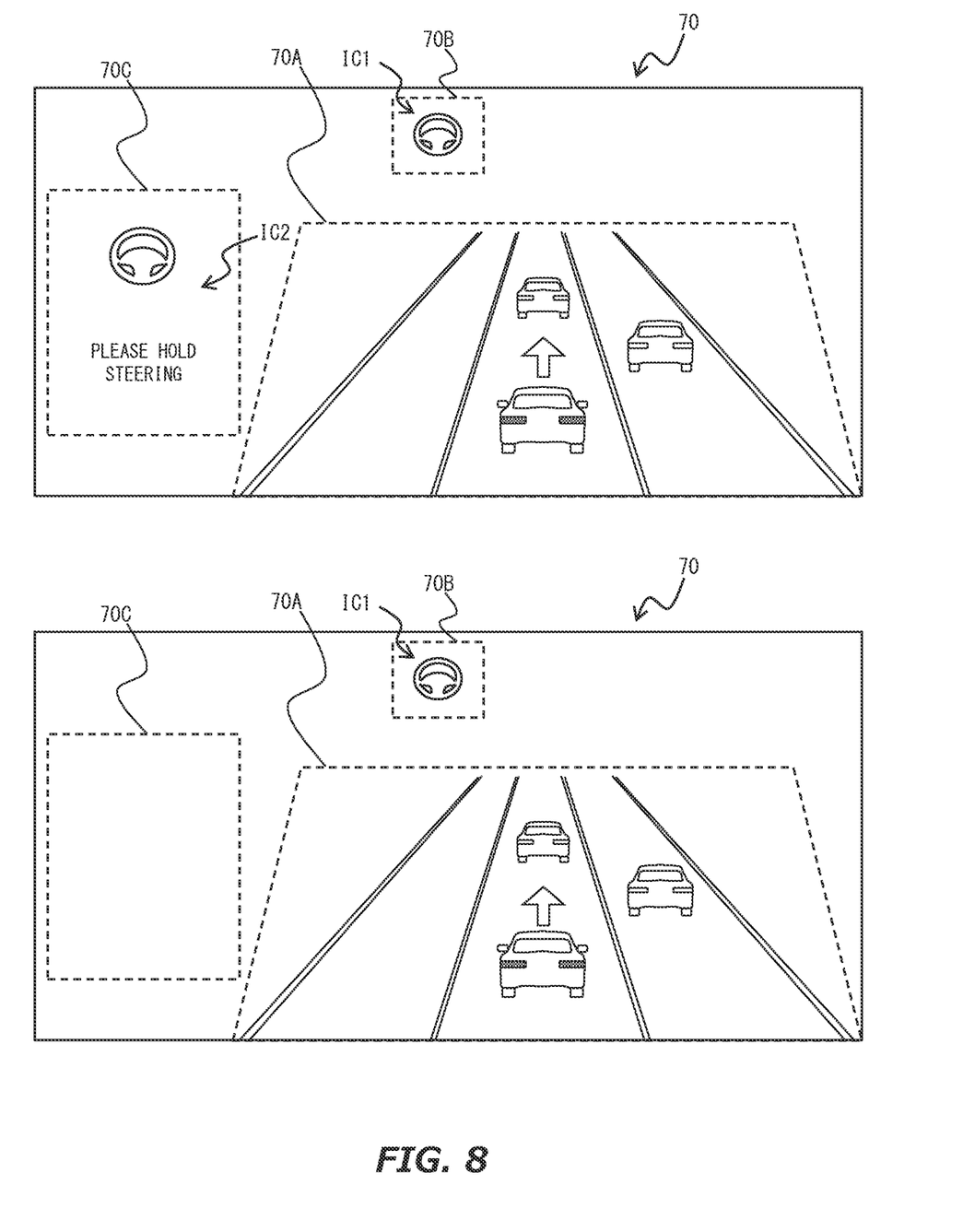
FIG. 8 is a diagram illustrating an example of a notification of a recommended behavior when relaxation notification processing is executed.

FIG. 8 is a diagram illustrating an example of a notification of a recommended behavior when relaxation notification processing is executed. In an example shown in the upper part of FIG. 8, an icon IC1 simulating the steering wheel is displayed in the display area 70B. In addition, an icon IC2 is displayed in the display area 70C in which an illustration larger than the icon IC1 is combined with a message "Please hold steering". The icons IC1 and IC2 correspond to recommended behavior information outputted to the display device 70 according to the execution of the display layout control.

In both the examples shown in the upper and lower parts of FIG. 8, the notification of the recommended behavior by voice output is omitted. In the example shown in the lower part of FIG. 8, in addition to the omission of the voice output, the notification of the recommended behavior in the display area 70C (i.e., the icon IC2 shown in the upper part) is omitted.

4. Effect

According to the display and voice output control system according to the present embodiment described above, a two-step judgment of the notification condition and the notification relaxation conditions is performed. When this two-step judgment is performed, it is possible to minimize the notification of the recommended behavior during the automated driving control. Therefore, it is possible to suppress the driver from feeling annoyed with the attention-seeking while performing the attention-seeking in case it becomes difficult to continue automated driving control.

What is claimed is:

1. An output control system of a vehicle in which automated driving is performed, the system comprising:
    a display device which is configured to visually notify a recommended behavior of a driver of the vehicle during the automated driving;
    a voice output device which is configured to audibly notify the recommended behavior during the automated driving; and
    a controller that comprises a processor and associated memory and is configured to execute notification control of the recommended behavior by the display device and the voice output device, the notification control comprising:
    judging whether or not a notification condition of the recommended behavior is satisfied;
    judging whether or not a category of the recommended behavior corresponds to a recommended behavior notification;
    if it is judged that the notification condition is satisfied, judging, based on a status of the driver and a driving status of the vehicle, whether or not a notification relaxation condition of the recommended behavior is satisfied;
    if it is judged that the notification relaxation condition is not satisfied of the category of the recommended behavior does not correspond to the recommended behavior notification, executing normal notification processing in which an output status of the recommended behavior in both the display device and the voice output device is controlled to an active state; and
    if it is judged that the notification relaxation conditions is satisfied and the category of the recommended behavior corresponds to the recommended behavior notification, executing relaxation notification processing in which the output status of the recommended behavior in the voice output device is controlled to an inactive state.

2. The output control system according to claim 1,
    wherein the display device includes a plurality of display devices, and
    wherein, in the relaxation notification processing, the controller is configured to control the output status of the recommended behavior in a part of the plurality of display devices and the voice output device to the inactive state.

3. The output control system according to claim 1,
    wherein a notification of the recommended behavior by the display device is performed by individually displaying an icon indicating the recommended behavior on a plurality of display areas of the display device, and
    wherein, in the relaxation notification processing, the controller is configured to control both a display state of the icon in a part of the plurality of display areas and the output state in the voice output device to the inactive state.

* * * * *

UNITED STATES PATENT AND TRADEMARK OFFICE
CERTIFICATE OF CORRECTION

| | |
|---|---|
| PATENT NO. | : 11,981,342 B2 |
| APPLICATION NO. | : 17/360453 |
| DATED | : May 14, 2024 |
| INVENTOR(S) | : Kiyotoshi Sekine et al. |

It is certified that error appears in the above-identified patent and that said Letters Patent is hereby corrected as shown below:

In the Claims

Column 12, Claim number 1, Line number 29:
Delete
"not satisfied of the category of the recommended"
Insert
-- not satisfied or the category of the recommended --

Signed and Sealed this
Sixth Day of August, 2024

Katherine Kelly Vidal
Director of the United States Patent and Trademark Office